United States Patent
Kimpara

(10) Patent No.: US 10,236,740 B2
(45) Date of Patent: Mar. 19, 2019

(54) STATOR OF MOTOR AND INNER ROTOR-TYPE MOTOR INCLUDING STATOR

(71) Applicant: MINEBEA MITSUMI INC., Nagano (JP)

(72) Inventor: Shuhei Kimpara, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 189 days.

(21) Appl. No.: 15/354,318

(22) Filed: Nov. 17, 2016

(65) Prior Publication Data

US 2017/0163118 A1  Jun. 8, 2017

(30) Foreign Application Priority Data

Dec. 2, 2015 (JP) ................. 2015-235409

(51) Int. Cl.
| | |
|---|---|
| H02K 3/52 | (2006.01) |
| H02K 1/14 | (2006.01) |
| H02K 1/27 | (2006.01) |
| H02K 3/18 | (2006.01) |
| H02K 3/30 | (2006.01) |
| H02K 5/22 | (2006.01) |
| H02K 21/16 | (2006.01) |

(52) U.S. Cl.
CPC ............ *H02K 3/521* (2013.01); *H02K 1/146* (2013.01); *H02K 1/2706* (2013.01); *H02K 3/18* (2013.01); *H02K 3/30* (2013.01); *H02K 5/225* (2013.01); *H02K 21/16* (2013.01)

(58) Field of Classification Search
CPC ...... H02K 3/521; H02K 1/146; H02K 1/2706; H02K 3/18; H02K 3/30; H02K 5/225; H02K 21/16
See application file for complete search history.

(56) References Cited

U.S. PATENT DOCUMENTS

| | | | | |
|---|---|---|---|---|
| 5,859,486 | A * | 1/1999 | Nakahara ................. | H02K 1/14 310/216.004 |
| 6,121,711 | A * | 9/2000 | Nakahara ................. | H02K 1/14 242/432.3 |
| 6,504,284 | B1 * | 1/2003 | Kazama ................... | H02K 1/12 29/596 |
| 6,759,785 | B2 * | 7/2004 | Miyake .................... | H02K 1/14 310/254.1 |
| 7,663,277 | B2 * | 2/2010 | Kinoshita .............. | H02K 3/522 310/68 B |

(Continued)

FOREIGN PATENT DOCUMENTS

JP  2014-075907 A  4/2014

*Primary Examiner* — Emily P Pham
(74) *Attorney, Agent, or Firm* — Pearne & Gordon LLP

(57) ABSTRACT

A stator of a motor comprises a terminal. The terminal includes: a leg portion, a hook portion including an open end and disposed on a core outer circumference part at a position corresponding to one of core tooth parts in a circumferential direction, and a coupling portion extending from the leg portion in the circumferential direction along the core outer circumference part and connected to the hook portion. An end portion of a coil is connected to the hook portion. The coupling portion of the terminal is bent to locate the hook portion radially outside the core tooth parts.

8 Claims, 12 Drawing Sheets

(56) References Cited

U.S. PATENT DOCUMENTS

| | | | | |
|---|---|---|---|---|
| 7,847,466 B2* | 12/2010 | Nagai | ................... | H02K 1/148 |
| | | | | 310/216.004 |
| 8,683,675 B2* | 4/2014 | Yuya | ..................... | H02K 1/148 |
| | | | | 29/596 |
| 9,627,932 B2* | 4/2017 | Jang | ....................... | H02K 1/18 |
| 9,780,613 B2* | 10/2017 | Yamaguchi | ......... | H02K 1/2766 |
| 2003/0085314 A1* | 5/2003 | Takano | ............... | H02K 15/095 |
| | | | | 242/432.2 |
| 2010/0170057 A1* | 7/2010 | Lee | ......................... | A47L 5/22 |
| | | | | 15/319 |
| 2015/0194779 A1* | 7/2015 | Jo | ........................ | H01R 39/32 |
| | | | | 310/234 |
| 2016/0301276 A1* | 10/2016 | Saki | ..................... | H02K 3/522 |

\* cited by examiner

STATOR OF MOTOR AND INNER ROTOR-TYPE MOTOR INCLUDING STATOR

CROSS REFERENCE TO RELATED APPLICATIONS

This application claims the benefit of Japanese Patent Application No. 2015-235409, filed on Dec. 2, 2015, which is hereby incorporated by reference in its entirety.

BACKGROUND

Technical Field

The present disclosure relates to a stator of a motor and an inner rotor-type motor including the stator.

Background Art

A stator structure of a motor including a plurality of core pieces annularly arranged along the circumferential direction of the motor has been known. Each of the plurality of core pieces includes an arcuate portion having an arcuate shape and a tooth part projecting radially inward from the arcuate portion. The arcuate portion includes a contact portion provided at an end portion on the circumferential direction side of the core piece, the contact portion being in contact with the core piece adjacent thereto, and a cutout portion formed on the radially outer side of the contact portion. The cutout portion is formed at a dimension for preventing the plurality of core pieces from coming into contact with one another when the core pieces are developed linearly. The stator structure further includes a coil wound around the tooth part in each of the plurality of core pieces and an insulator that insulate the plurality of core pieces and the coils from each other. The insulator includes a covering portion that covers each of the plurality of core pieces and an extending portion that extends from the covering portion along a rotating shaft of the motor. A connecting wire that connects a coil wound on one core piece among the plurality of core pieces and a coil wound on another core piece passes a position of a radially outside of the extending portion of the one insulator and generally overlapping a boundary between the contact portion of the one core piece and the cutout portion of the other core piece (see Japanese Patent Application Laid-Open No. 2014-075907).

Incidentally, when the diameter of a coil wound on a stator is small, a film for insulation provided on the surface of the coil is thin. Therefore, when an end portion of the coil is soldered to a terminal such as a power supply terminal or a common terminal of a motor, since the film melts, removal of the film is simultaneously performed and the coil and the terminal become conductive.

However, when a coil having a large diameter is used in order to feed a large current to the motor for the purpose of an increase in an output of the motor, since the thickness of a film provided on the surface of the coil increases, it is difficult to remove the film in a process for soldering the end portion of the coil to the terminal.

As a method of solving such a situation in the removal of the film, there is a method called fusing caulking for holding the end portion of the coil with the terminal and feeding an electric current while compressing the end portion of the coil to melt the film of the coil with heat generated at that time and firmly attaching and connecting the end portion of the coil to the terminal while securing conduction between the end portion of the coil and the terminal.

However, in order to use this method, it is necessary to provide a U-shaped turn-back (a hook portion) in the terminal such that the end portion of the coil can be held. In the case of the thick coil having the large diameter for the purpose of feeding a large current, since the hook portion has to hold the thick coil, the width of the hook portion itself increases.

The thickness of the terminal itself is also increased according to the large current. Therefore, the width of the terminal including the hook portion further increases.

Then, when the terminal is fixed to the stator, in a small motor, it is difficult to secure, above an end face in the axial direction, a sufficient distance for receiving the width of the terminal including the hook portion. The hook portion is located to protrude above a portion on which the coil of the stator is wound. The hook portion hinders turning of a nozzle of a winder that winds the coil. Therefore, the winding of the coil cannot be easily performed.

SUMMARY

The present disclosure is related to providing a stator of a motor and an inner rotor-type motor including the stator that prevent a hook portion from hindering winding of a coil and can be reduced in size and can be increased in an output.

One aspect of the present disclosure is understood by the following configuration.

(1) A stator of a motor comprises: a core section including a core outer circumference part forming an annular shape and a plurality of core tooth parts projecting radially inward from the core outer circumference part; an insulator covering at least an outer circumference of each of the core tooth parts and an end face in an axial direction of the core outer circumference part; a coil wound on each of the core tooth parts via the insulator; and a terminal attached to the core outer circumference part via the insulator, an end portion of the coil being connected to the terminal, wherein the terminal includes: a leg portion extending in the axial direction; a hook portion including an open end opened in the axial direction and disposed on the core outer circumference part at a position corresponding to one of the core tooth parts in a circumferential direction, the end portion of the coil being connected to the hook portion; and a coupling portion extending from the leg portion in the circumferential direction along the core outer circumference part and connected to the hook portion, the insulator includes a terminal holding portion, to which the leg portion is attached, at a position in the end face of the core outer circumference part in a position not corresponding to the core tooth parts in the circumferential direction and a position corresponding to the leg portion of the terminal, the hook portion includes: a base end portion located on an outer side in the radial direction; a side piece portion located on the inner side in the radial direction to be arranged side by side with the base end portion; and a connecting portion connecting an end portion of the base end portion and an end portion of the side piece portion located on an opposite side of the open end side and forming a closed end, and the coupling portion of the terminal is bent to locate the hook portion radially outside the core tooth parts.

(2) In the configuration of (1) above, the core section includes a plurality of core piece main bodies, each of the core piece main bodies includes: an arcuate portion disposed in a circular shape to be a part of the core outer circumference part forming the annular shape; and the core tooth part located substantially in a center in the circumferential direction of the arcuate portion and projecting radially inward from the arcuate portion, the insulator is provided in each of the core piece main bodies to cover an outer circumference of the core tooth part of the core piece main body and an end face of the arcuate portion forming the end face of the core outer circumference part, and the terminal holding portion is located on the outer side in the circumferential direction along the arcuate portion of the insulator covering the end face of the arcuate portion.

(3) In the configuration of (1) or (2) above, the terminal is a power supply terminal including a power supply portion extending from the base end portion of the hook portion in the axial direction, the terminal includes: a pair of the leg portions provided to locate the hook portion between the pair of leg portions; and a pair of the coupling portions connected to the base end portion of the hook portion from the respective pair of leg portions, and the pair of the coupling portions is bent in a manner in which the pair of the coupling portions inclines from the respective leg portions in a direction approaching the base end portion and extends radially outward, and thereafter becomes substantially parallel to the base end portion before the base end portion, to locate the hook portion radially outside the core tooth parts.

(4) In the configuration of (1) or (2) above, the terminal is a power supply terminal including a power supply portion extending from the base end portion of the hook portion in the axial direction, the terminal includes: a pair of the leg portions provided to locate the hook portion between the pair of the leg portions; and a pair of the coupling portions connected to the base end portion of the hook portion from the respective pair of the leg portions, and the pair of the coupling portions is bent in a manner in which the pair of the coupling portions extends toward the base end portion from the respective leg portions while curving radially outward, to locate the hook portion radially outside the core tooth parts.

(5) In the configuration of (1) or (2) above, the terminal is a power supply terminal including a power supply portion extending from the base end portion of the hook portion in the axial direction the terminal includes: the single leg portion corresponding to the hook portion; and the coupling portion connected to the base end portion of the hook portion from the leg portion, and the coupling portion is bent in a manner in which the coupling portion inclines from the leg portion in a direction approaching the base end portion and extends radially outward and thereafter becomes substantially parallel to the base end portion before the base end portion, to locate the hook portion radially outside the core tooth parts.

(6) In the configuration of (1) or (2) above, the terminal is a common terminal including the hook portions, a number of the hook portions corresponds to a number of phases of the motor, the terminal includes: a pair of the leg portions provided for each of the hook portions to locate the hook portion between the pair of the leg portions; a pair of the coupling portions connected from the pair of the leg portions to the base end portion of the hook portion corresponding to the pair of the leg portions; and a bridging portion connecting the leg portions located between the hook portions, the bridging portion is disposed not to be located on or above the core tooth parts, and the pair of the coupling portions is bent in a manner in which the pair of the coupling portions inclines from the respective leg portions in a direction approaching the base end portion of the hook portion corresponding to the leg portions and extends radially outward and thereafter becomes substantially parallel to the base end portion of the corresponding hook portion before the base end portion of the corresponding hook portion, to locate the hook portion radially outside the core tooth parts.

(7) In the configuration of (6) above, the terminal further includes a leg portion provided in the bridging portion to be located adjacent to the leg portions connected by the bridging portion.

(8) An inner rotor-type motor of the present disclosure comprises: the stator of the motor according to any one of the above configurations (1) to (7); and a rotor rotatably disposed radially inside the stator.

According to the present disclosure, it is possible to provide a stator of a motor and an inner rotor-type motor including the stator that prevents a hook portion from hindering winding of a coil and can be reduced in size of the motor and can be increased in an output of the motor.

BRIEF DESCRIPTION OF THE DRAWINGS

FIG. 6A is a perspective view of the power supply terminal and FIG. 6B is a plan view of the power supply terminal viewed from the upper side in FIG. 6A;

FIG. 9A is a perspective view of the power supply terminal and FIG. 9B is a plan view of the power supply terminal viewed from the upper side in FIG. 9A;

FIG. 10A is a perspective view of the power supply terminal and FIG. 10B is a plan view of the power supply terminal viewed from the upper side in FIG. 10A;

DETAILED DESCRIPTION

A mode for carrying out the present disclosure (hereinafter referred to as "embodiment") is explained in detail below with reference to the accompanying drawings.

Note that the same elements are denoted by the same numbers throughout the entire explanation of the embodiment.

Figure 1:
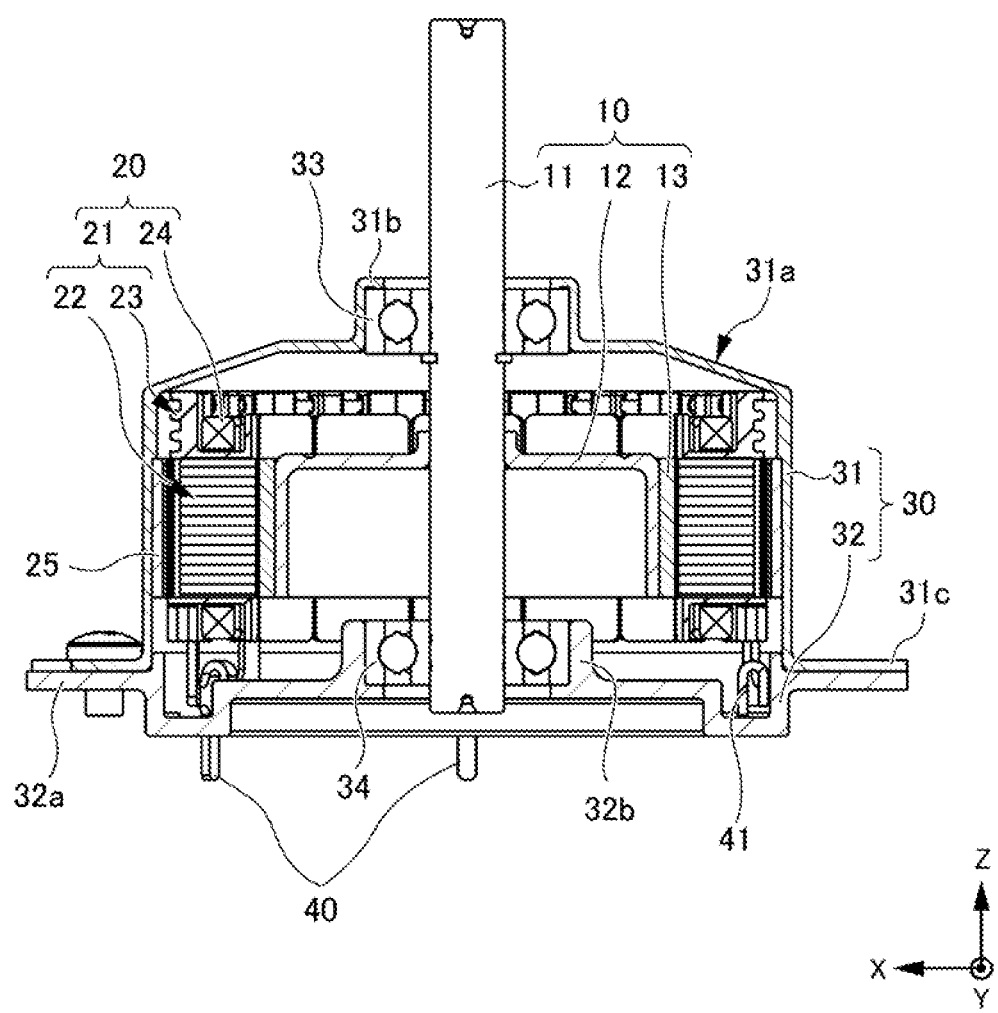
FIG. 1 is a sectional view of an inner rotor-type brushless motor including a stator of a motor in an embodiment according to the present disclosure.

FIG. 1 is a sectional view of an inner rotor-type motor 1 (hereinafter may simply be described as motor 1) including a stator 20 in the embodiment according to the present disclosure. In the following explanation, the motor 1 is explained and the stator 20 in the embodiment according to the present disclosure is also explained.

Note that the motor 1 in this embodiment is a brushless motor but does not need to be limited to a brushless motor.

As shown in FIG. 1, the motor 1 in this embodiment includes a rotor 10, the stator 20, and a housing 30 covering the rotor 10 and the stator 20.

Rotor

The rotor 10 includes a shaft 11 functioning as a rotating shaft, a rotor yoke 12 fixed to the shaft 11 and rotating together with the shaft 11, and a rotor magnet 13 provided on an outer circumferential surface of the rotor yoke 12.

One side of the shaft 11 is supported by a bearing 33 and the other side of the shaft 11 is supported by a bearing 34 such that the rotor 10 is located in the center of the stator 20 and capable of rotating with respect to the stator 20.

Stator

The stator 20 in this embodiment includes a plurality of core pieces 21 explained below. The stator 20 has a configuration in which the plurality of core pieces 21 are bound in an annular shape.

The respective core pieces 21 include core piece main bodies 22 and insulators 23 covering outer circumferences of the core piece main bodies 22.

The stator 20 includes coils 24 wound on the core pieces 21 via the insulators 23, respectively. The stator 20 also includes a binding part 25 annularly binding the plurality of core pieces 21.

The stator 20 is fixed by, for example, being pressed into a frame 31 of the housing 30.

Note that the fixing of the stator 20 is not limited to the press-in. A desired fixing method such as bonding fixing may be selected as appropriate.

Housing

The housing 30 includes the frame 31 housing the stator 20 and the rotor 10 and a lid portion 32 provided to close an opening side of the frame 31.

The frame 31 has a bottomed cup shape. A concave portion 31b, in which the bearing 33 is housed, is formed in the center of a bottom portion 31a of the frame 31. A hole for leading the shaft 11 to the outside is provided in the bottom center of the concave portion 31b.

The lid portion 32 is a substantially disk-like member including, in the center, a receiving portion 32b receiving the bearing 34, and the lid portion 32 is provided with, in the outer circumference, a flange 32a fixed by screws to a flange 31c of the frame 31 provided on the opening side of the frame 31.

A hole, in which the end portion on the other side of the shaft 11 is disposed as in the concave portion 31b of the frame 31, is provided in the center of the receiving portion 32b.

Further, holes for leading power supply terminals 40 explained below to the outside are also provided in the lid portion 32.

Core Piece

In this embodiment, the stator 20 is configured with the plurality of core pieces 21. In the following explanation, the core piece 21 is explained and the stator 20 is more specifically explained.

Figure 2:
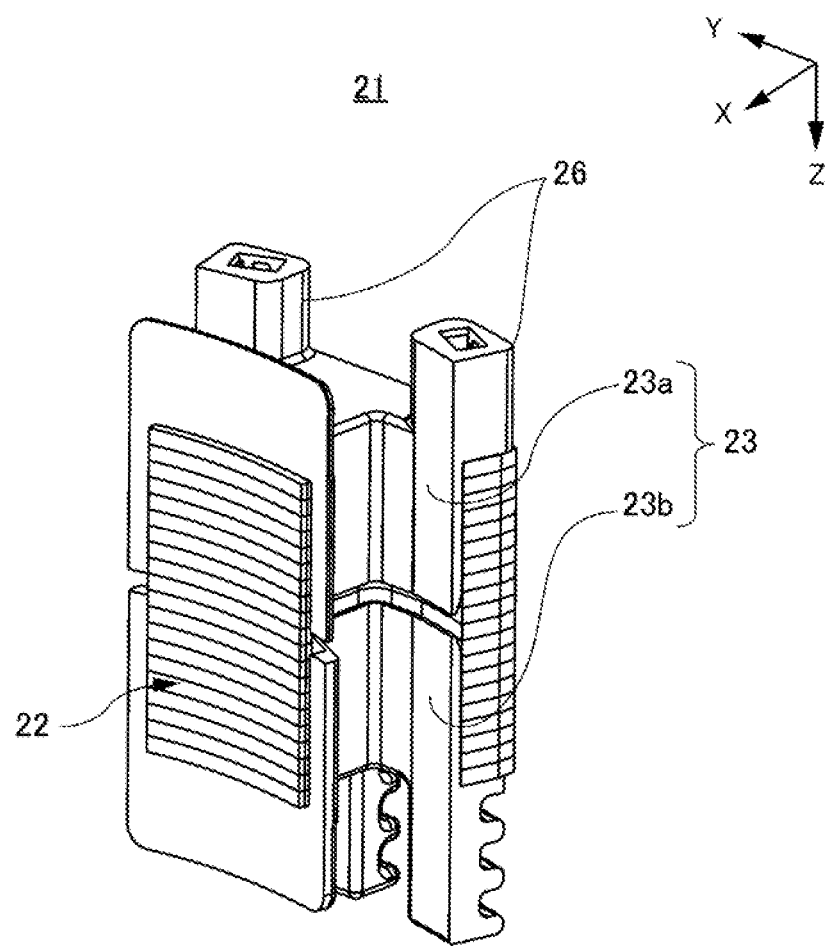
FIG. 2 is a perspective view of a core piece in the embodiment according to the present disclosure.
Figure 3:
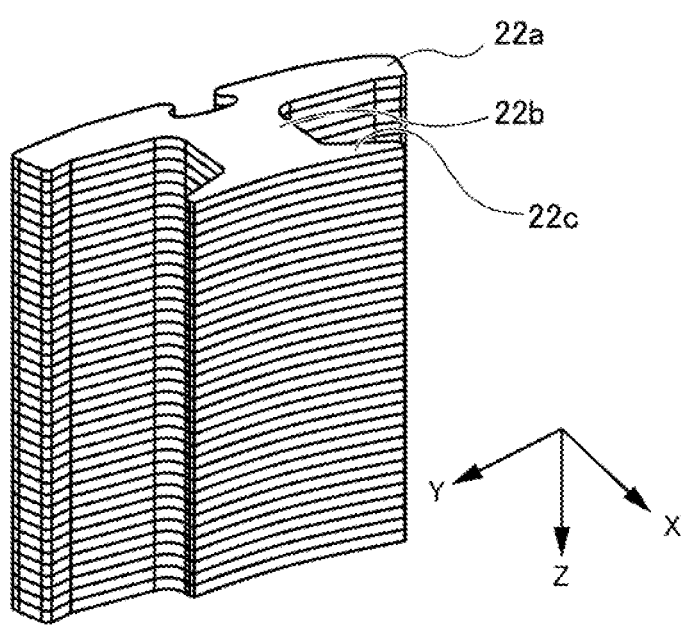
FIG. 3 is a perspective view of a core piece main body in the embodiment according to the present disclosure.
Figure 4:
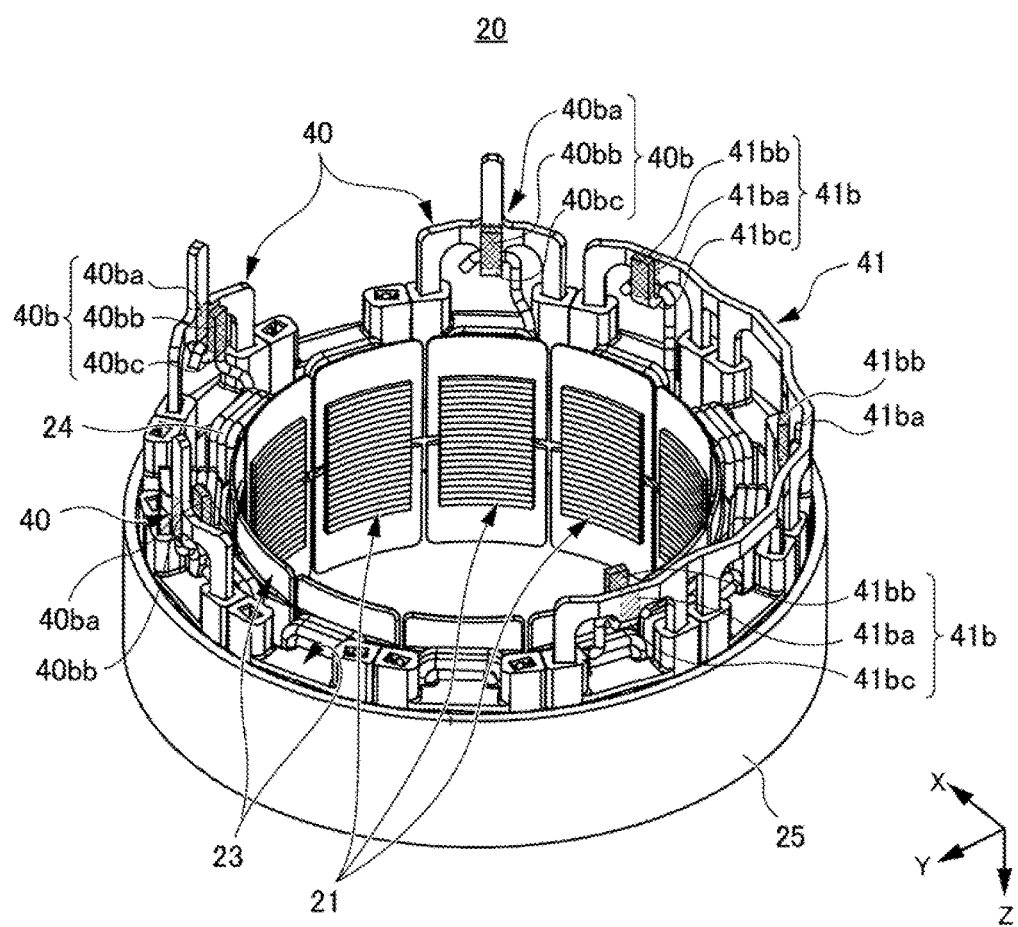
FIG. 4 is a perspective view of the stator of the embodiment according to the present disclosure.
Figure 5:
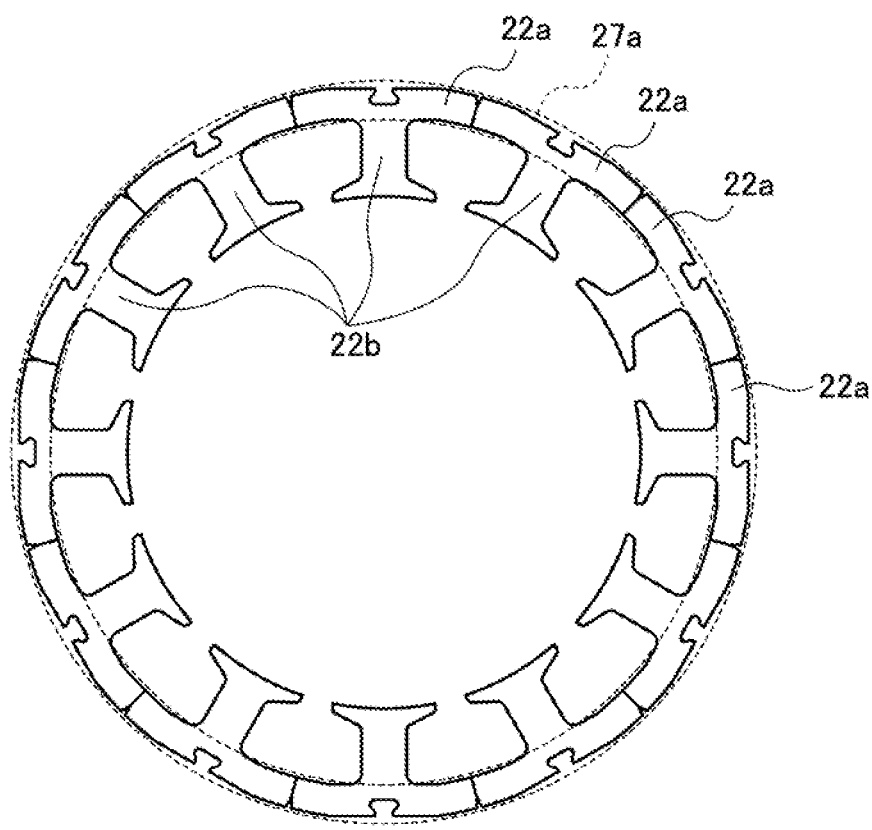
FIG. 5 is a plan view of a core section of the stator of the embodiment according to the present disclosure.

FIG. 2 is a perspective view showing the core piece 21 of the stator 20. FIG. 3 is a perspective view showing the core piece main body 22. FIG. 4 is a perspective view of the stator 20. FIG. 5 is a plan view of a core section 27 in the stator 20.

Note that, in FIGS. 2 and 4, the lower side in FIG. 1 is illustrated as being located on the upper side to clearly show portions related to the power supply terminals 40 and a common terminal 41 explained below.

As shown in FIG. 4, the stator 20 includes the plurality of core pieces 21 annularly bound by the binding part 25.

Each of the core pieces 21 includes, as shown in FIG. 2, the core piece main body 22 and the insulator 23 that covers the core piece main body 22.

More specifically, the core piece main body 22 includes, as shown in FIG. 3, an arcuate portion 22a and a core tooth part 22b located substantially in the center of the circumferential direction of the arcuate portion 22a and projecting from the arcuate portion 22a. The core tooth part 22b includes a distal end portion 22c of the core tooth part 22b on the opposite side of the arcuate portion 22a.

In the stator 20, the core section 27 is configured in a state in which the core piece main bodies 22 are annularly disposed as shown in FIG. 5. The core section 27 includes a core outer circumference part 27a forming an annular shape configured by disposing the arcuate portions 22a in a circular shape and a plurality of core tooth parts 22b projecting radially inward from the core outer circumference part 27a.

That is, the arcuate portion 22a of the core piece main body 22 is a portion forming a part of the core outer circumference part 27a forming the annular shape. The core tooth part 22b of the core piece main body 22 is located substantially in the center of the arcuate portion 22a of each of the core piece main bodies 22 in the circumferential direction along the core outer circumference part 27a and formed to project radially inward from the arcuate portion 22a.

However, the core section 27 is not limited to a core section including a plurality of core piece main bodies 22 as in this embodiment. The core section 27 may be a core section including an annular integrated core, that is, a core section including a core including the core outer circumference part 27a forming the annular shape connected in series and the plurality of core tooth parts 22b projecting radially inward from the core outer circumference part 27a.

On the other hand, the insulator 23 includes, as shown in FIG. 2, the other side insulator 23a corresponding to a half on the other side of the core piece main body 22 and one side insulator 23b corresponding to a half of one side. The insulator 23 is attached to cover the outer circumference of the core tooth part 22b of the core piece main body 22 and the end face in the axial direction of the arcuate portion 22a.

Note that the insulator 23 does not need to be limited to an insulator including two parts of a half-divided structure as in this embodiment. The insulator 23 may be integrally molded in the core piece main body 22 through the usage of insert molding or the like.

As explained above with reference to FIG. 5, in the stator 20, the core section 27 is configured by binding the plurality of core piece main bodies 22. The end face in the axial direction of the arcuate portion 22a of the core piece main body 22 forms the end face of the core outer circumference part 27a. The core tooth part 22b of the core piece main body 22 forms the core tooth part 22b of the core section 27.

Therefore, the insulators 23, each of which covers the end face in the axial direction of the arcuate portion 22a of the core piece main body 22 and the outer circumference of the core tooth part 22b, cover the outer circumference of the core tooth parts 22b of the core section 27 and the end face in the axial direction of the core outer circumference part 27a.

Note that, as explained above, even when the core section 27 includes the core outer circumference part 27a forming the annular shape connected in series and the plurality of core tooth parts 22b projecting radially inward from the core outer circumference part 27a, the insulator 23 may cover the outer circumference of the plurality of core tooth parts 22b and the end face in the axial direction of the core outer circumference part 27a. As in this embodiment, the insulator 23 may be mounted as an insulator divided into halves. The insulator 23 may be integrally molded in the core section 27 by the insert molding.

As shown in FIG. 2, the insulators 23 include terminal holding portions 26 to which leg portions of terminals explained below (leg portions 40a of the power supply terminals 40, leg portions 41a and 41da of the common terminal 41), which are formed in positions on the end face on the other side in the axial direction of the arcuate portion 22a (see FIG. 3) of the core piece main body 22 configuring the core section 27 (see FIG. 5), are attached. Positions where the terminal holding portions 26 are formed are positions not overlapping the core tooth part 22b and not corresponding to the core tooth part 22b.

More specifically, the terminal holding portions 26 are formed in the insulator 23 to be located on the outer side in the circumferential direction along the arcuate portion 22a of the insulator 23 covering the end face on the other side in the axial direction of the arcuate portion 22a.

As explained above, the end face in the axial direction of the arcuate portion 22a configures the end face of the core outer circumference part 27a. Therefore, the position where the terminal holding portion 26 of the insulator 23 is formed is a position not overlapping the core tooth part 22b and not corresponding to the core tooth part 22b in the circumferential direction of the core outer circumference part 27a even when viewed in a position on the core section 27 shown in FIG. 5.

As shown in FIG. 4, in a state of the stator 20 in which the plurality of core pieces 21 are bound in the annular shape, the positions of the insulators 23, in which the terminal holding portions 26 are formed, correspond to positions corresponding to the leg portions 40a of the power supply terminals 40, the leg portions 41a and 41da of the common terminal 41) of the terminals (the power supply terminals 40, the common terminal 41 (see FIG. 4)) explained below.

Therefore, the insulator of the stator 20 configured by a plurality of insulators 23 includes the terminal holding sections 26, to which the leg portions are attached, in positions on the end face of the core outer circumference part 27a in positions not corresponding to the core tooth parts 22b in the circumferential direction of the core outer circumference part 27a, and in the positions corresponding to the leg portions of the terminals (the leg portions 40a of the power supply terminals 40, the leg portions 41a and 41da of the common terminal 41).

Note that, even when the core section 27 includes the core outer circumference part 27a forming the annular shape connected in series and the plurality of core tooth parts 22b projecting from the core outer circumference part 27a to the inside, the terminal holding portions 26 may be provided in the insulator in the same manner.

That is, the insulator may include the terminal holding portions 26, to which the leg portions are attached, in positions on the end face of the core section 27 in positions not overlapping the core tooth parts 22b when viewed in the circumferential direction along the core outer circumference part 27a of the core section 27, the positions corresponding to the leg portions 40a of the power supply terminals 40 and the leg portions 41a of the common terminal 41.

The terminals (the power supply terminals 40 and the common terminal 41) attached to the terminal holding portions 26 are explained.

As shown in FIG. 4, the stator 20 in this embodiment is a stator for a 10-pole/12-slot three-phase type brushless motor in which twelve core pieces 21 are annularly bound by the binding part 25.

Therefore, in the stator 20, three power supply terminals 40 are attached to correspond to the phases and one common terminal 41 is attached.

However, this is an example. The number of poles, the number of slots, the number of phases, and the like may be changed according to a desired motor. The number of the power supply terminals 40 and the number of common terminals 41 may be changed according to the number of phases.

Power Supply Terminal

Figures 6A, 6B:
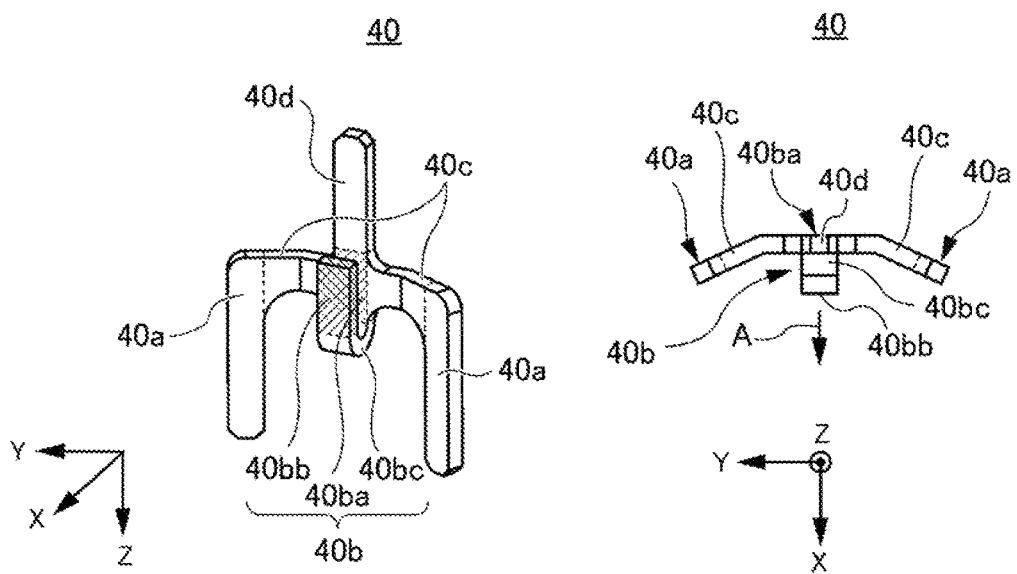
FIGS. 6A and 6B are views showing a power supply terminal in the embodiment according to the present disclosure.

FIGS. 6A and 6B are views showing the power supply terminal 40. FIG. 6A is a perspective view of the power supply terminal 40. FIG. 6B is a plan view of the power supply terminal 40 viewed from the upper side in FIG. 6A.

Figure 7:
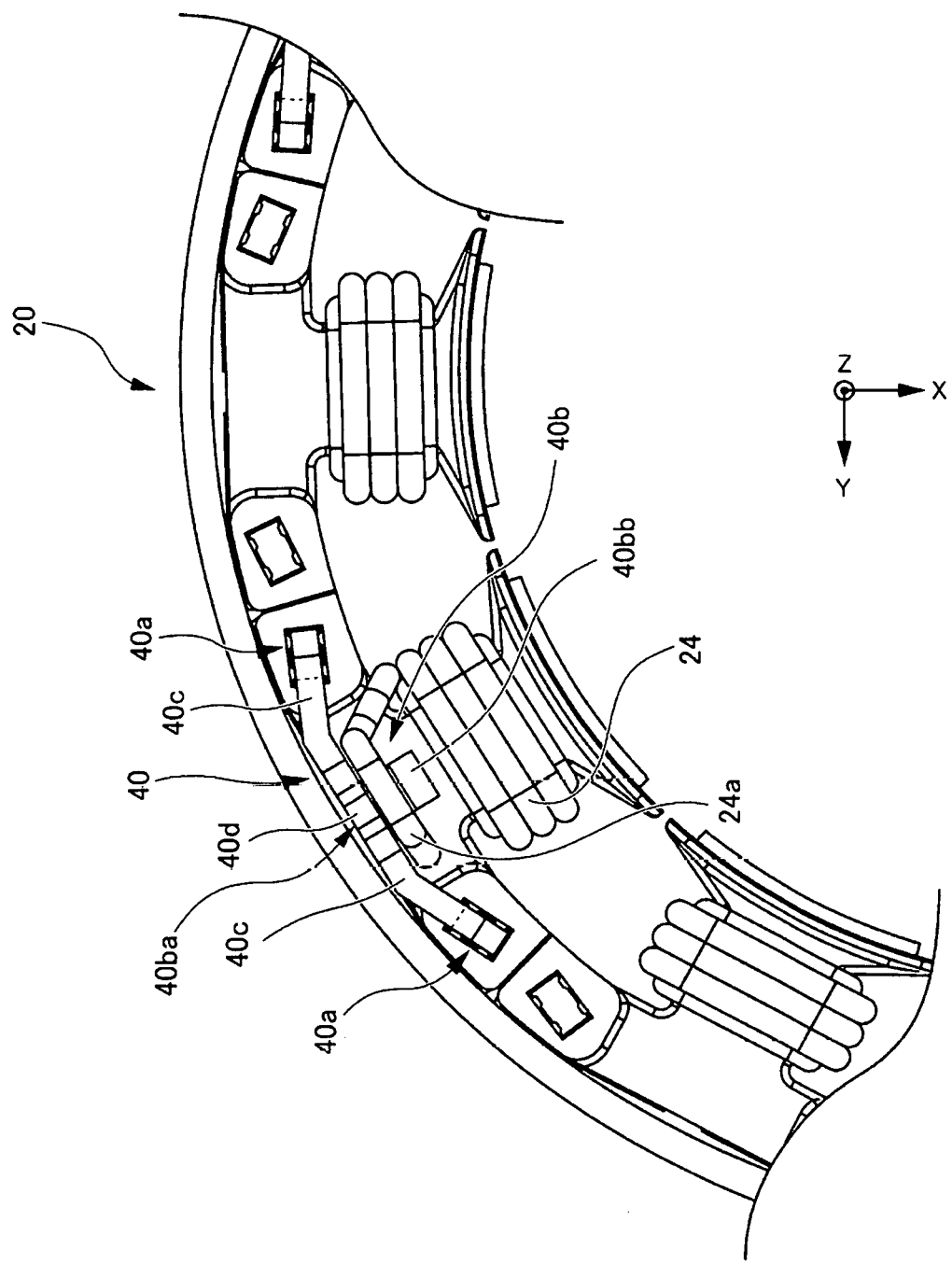
FIG. 7 is an enlarged plan view of a part of the stator on a side where the power supply terminal is seen in the embodiment according to the present disclosure.

FIG. 7 is an enlarged plan view of a part of the stator 20 on a side where the power supply terminal 40 is seen.

As shown in FIG. 7, the power supply terminal 40 is a terminal to which an end portion 24a of the coil 24 is connected. As shown in FIGS. 6A and 6B, the power supply terminal 40 includes a hook portion 40b to which the end portion 24a of the coil 24 is connected, a pair of the leg portions 40a provided to locate the hook portion 40b between the pair of the leg portions 40a, and a pair of coupling portions 40c extending from the respective pair of the leg portions 40a in the circumferential direction along the core outer circumference part 27a (see FIG. 5) and connected to the hook portion 40b.

As seen in FIGS. 6A and 7, the hook portion 40b includes a base end portion 40ba located on the outer side in the radial direction, a side piece portion 40bb located on the inner side in the radial direction to be arranged side by side with the base end portion 40ba, and a connecting portion 40bc connecting an end portion of the base end portion 40ba and an end portion of the side piece portion 40bb located on the opposite side of an open end side opened to the other side of the axial direction (the axial direction of the shaft 11 shown in FIG. 1) and forming a closed end. The coupling portions 40c are connected from the pair of the leg portions 40a to the base end portion 40ba of the hook portion 40b.

Note that the leg portions 40a are portions inserted into the terminal holding portions 26 when the power supply terminal 40 is attached to the stator 20. Therefore, the leg portions 40a are attached to the power supply terminal 40 to extend further to the one side of the axial direction (the axial direction of the shaft 11 shown in FIG. 1) than the hook portion 40b.

As shown in FIG. 7, the hook portion 40b is located radially outside the coil 24 in a position overlapping the coil 24 when viewed in the circumferential direction. The coil 24 is wound on the core tooth part 22b via the insulator 23.

The radially outside of the core tooth part 22b is the core outer circumference part 27a forming the annular shape of the core section 27 configured by the arcuate portion 22a. Therefore, the hook portion 40b is disposed on or above the core outer circumference part 27a in a position overlapping the core tooth part 22b and corresponding to the core tooth part 22b in the circumferential direction along the core outer circumference part 27a.

As shown in FIG. 6A, the hook portion 40b is formed in a U shape to hold the end portion 24a (see FIG. 7) of the coil 24. However, the hook portion 40b does not need to be limited to the U shape.

For example, the hook portion 40b may be formed in a generally V shape in which the base end portion 40ba and the side piece portion 40bb of the hook portion 40b are inclined from the open end side opened in the other side of the axial direction (the axial direction of the shaft 11 shown in FIG. 1) to the closed end on the opposite side of the open end to reduce a separation distance between the base end portion 40ba and the side piece portion 40bb. The hook portion 40b may be configured by a connecting portion 40bc directly connecting the closed end side of the base end portion 40ba and the closed end side of the side piece portion 40bb.

Further, the power supply terminal 40 includes a power supply portion 40d (see FIG. 6A) extending from the open end of the base end portion 40ba of the hook portion 40b in the axial direction (the axial direction of the shaft 11 shown in FIG. 1).

Figure 8:
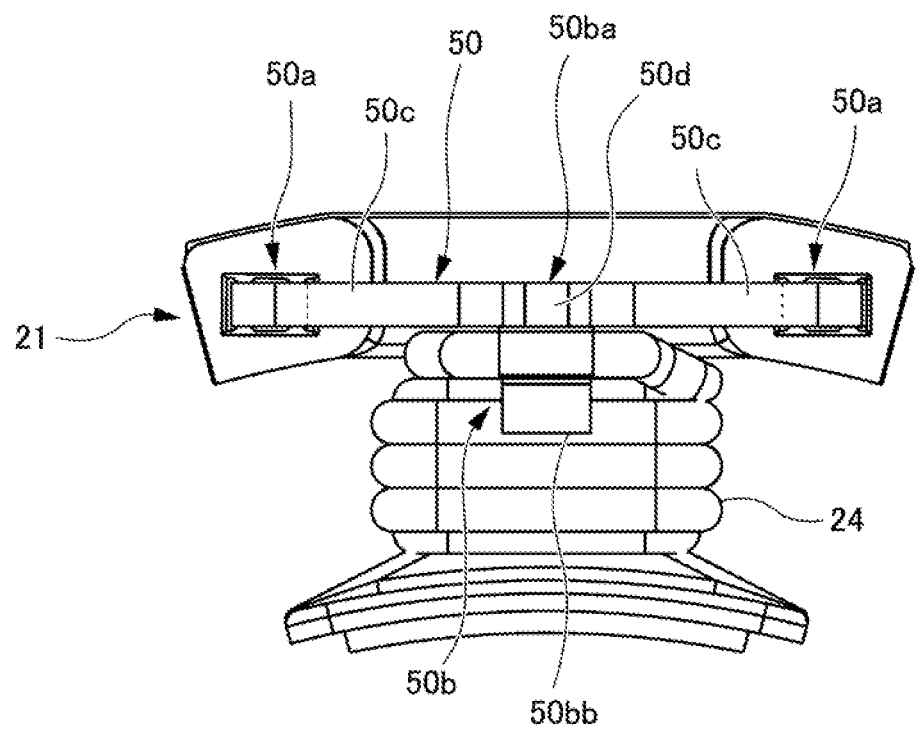
FIG. 8 is a plan view showing a state in which a power supply terminal for comparison to be compared with the power supply terminal in the embodiment according to the present disclosure is attached to the core piece.

A state in which a power supply terminal 50 for comparison to be compared with the power supply terminal 40 in this embodiment is attached to the core piece 21 is shown in FIG. 8.

Basic components of the power supply terminal 50 for comparison are the same as the components of the power supply terminal 40 in this embodiment. Therefore, the reference numeral 40 of the power supply terminal 40 is changed to 50. Concerning the same components, letters following the number 50 are set the same as the letters of the components of the power supply terminal 40.

As shown in FIG. 8, the power supply terminal 50 is different from the power supply terminal 40 in this embodiment in that coupling portions 50c are extended from a pair of leg portions 50a to linearly connect the pair of leg portions 50a and the leg portions 50a and a base end portion 50ba of a hook portion 50b are connected by the linear coupling portions 50c. When such linear coupling portions 50c are used, the hook portion 50b is located to protrude to the upper side of the coil 24.

Then, when the coil 24 is wound, the hook portion 50b become an obstacle and the hook portion 50b hinders the winding of the coil 24.

If the hook portion 50b is moved upward in the axial direction to a position deviating from (outside) a track of a winding nozzle of the hook portion 50b in order to avoid the hindrance, this leads to an increase in a motor size.

However, as it is seen from FIG. 7, in the power supply terminal 40 in this embodiment, the coupling portion 40c of the power supply terminal 40 is bent to locate the hook portion 40b radially outside the portion on which the coil 24 is wound (the portion of the core tooth part 22b of the core piece main body 22 shown in FIG. 3), in respect of the positions in the radial direction.

More specifically, as shown in FIG. 6B, the pair of the coupling portions 40c is bent in a manner in which the pair of the coupling portions 40c inclines from the respective leg portions 40a in a direction approaching the base end portion 40ba of the hook portion 40b and extends radially outward, and thereafter becomes substantially parallel to the base end portion 40ba before the base end portion 40ba, to locate the hook portion 40b radially outside the core tooth part 22b (not shown in the figure).

As a result, as shown in FIG. 7, the hook portion 40b is provided to offset radially outside than the portion where the coil 24 is located. Therefore, the hook portion 40b does not hinder the winding of the coil 24.

Since the coupling portions 40c become substantially parallel to the base end portion 40ba before the base end portion 40ba, it is possible to secure spaces on lateral sides of the hook portion 40b. Therefore, it is possible to make it easy to perform work for hooking the end portion 24a of the coil 24 on the hook portion 40b.

Further, in the case of such a bending structure, it is possible to reinforce the leg portions 40a against bending stress. Therefore, when the end portion 24a of the coil 24 is fixed to the hook portion 40b, it is possible to prevent the power supply terminal 40 from tilting.

More specifically, when the winding of the coil 24 ends, work for hooking the end of a coil wire on the hook portion 40b is necessary. However, when a thick coil is used as the coil 24 for the purpose of increasing an output, winding tension also increases according to the coil diameter. The coil wire pulled by strong tension is hooked on the hook portion 40b.

Then, force (bending stress) for inclining the power supply terminal 40 in a direction indicated by an arrow A in FIG. 6B is applied to the power supply terminal 40.

The leg portions 40a most easily tilt when the direction of force for inclining the leg portions 40a (see the arrow A) and the thickness direction of the leg portion 40a coincide with each other. However, as in this embodiment, when the bending structure is adopted, the leg portions 40a are located obliquely toward the hook portion 40b. Therefore, the thickness direction of the leg portions 40a and the direction of the force for inclining the leg portions 40a (see the arrow A) do not coincide with each other.

Therefore, the leg portions 40a in this embodiment tilt considerably less easily than when the leg portions 40a are provided to be parallel to the hook portion 40b.

The specific structure of the power supply terminal 40 is explained above with reference to FIGS. 6A, 6B and 7. However, the power supply terminal 40 is not limited to such structure and may be, for example, the power supply terminal 40 in a first modification shown in FIGS. 9A and 9B or a second modification shown in FIGS. 10A and 10B.

Figure 9A:
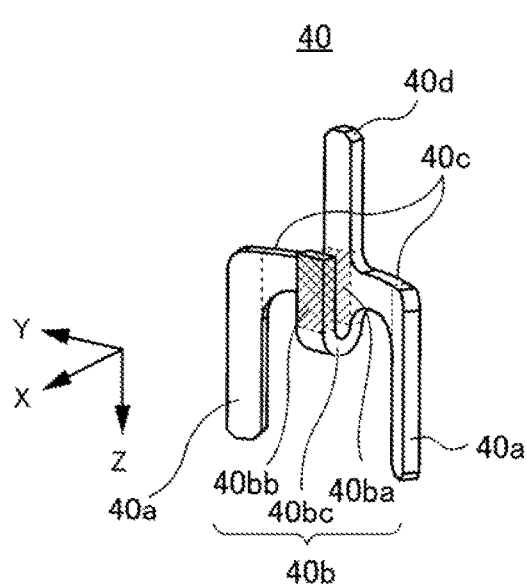
FIGS. 9A and 9B are views showing a first modification of the power supply terminal in the embodiment according to the present disclosure.
Figure 9B:
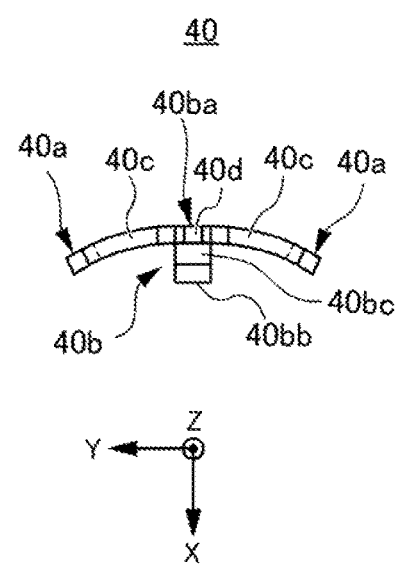

The first modification of the power supply terminal 40 shown in FIGS. 9A and 9B is the same as the embodiment in that the power supply terminal 40 includes the pair of the leg portions 40a, the U-shaped hook portion 40b, the pair of the coupling portions 40c provided to be connected from the respective pair of the leg portions 40a to the hook portion 40b, and the power supply portion 40d extending from the open end of the base end portion 40ba of the hook portion 40b in the axial direction (the axial direction of the shaft 11 shown in FIG. 1).

On the other hand, the first modification is different from the embodiment in that the pair of coupling portions 40c is bent in a manner in which the pair of the coupling portions 40c extends toward the base end portion 40ba of the hook portion 40b from the respective leg portions 40a with curving radially outward, to locate the hook portion 40b radially outside the core tooth part 22b (not shown in the figure).

Even when the portions of the coupling portions 40c are curved in this way, it is possible to locate the hook portion 40b in a position where the hook portion 40b does not hinder the winding of the coil 24. It is possible to prevent the leg portions 40a from easily tilting.

Since the spaces can be secured on the lateral side of the hook portion 40b, it is possible to make it easy to perform work for hooking the end portion 24a of the coil 24 on the hook portion 40b.

Figure 10A:
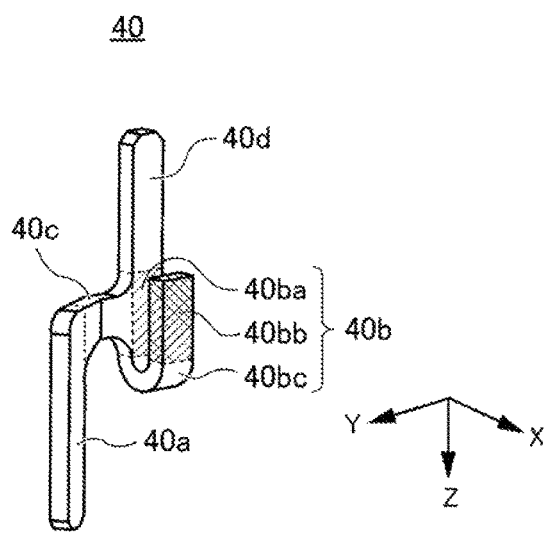
FIGS. 10A and 10B are views showing a second modification of the power supply terminal in the embodiment according to the present disclosure.
Figure 10B:
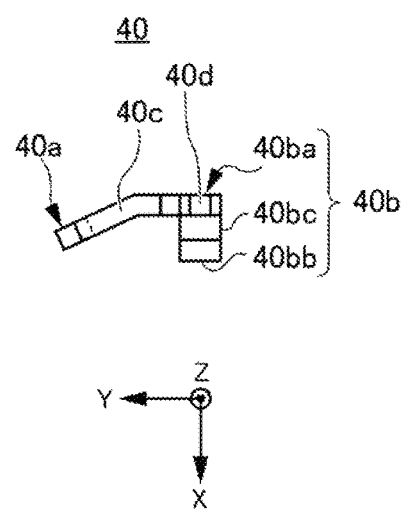

On the other hand, the second modification shown in FIGS. 10A and 10B has structure in which one leg portion 40a and one coupling portion 40c are removed from the power supply terminal 40 in the embodiment explained above.

That is, the part of the hook portion 40b, the leg portion 40a, and the coupling portion 40c includes one hook portion 40b, one leg portion 40a corresponding to the hook portion 40b, and one coupling portion 40c connected from the leg portion 40a to the base end portion 40ba of the hook portion 40b.

The coupling portion 40c is bent in manner in which the coupling portion 40c inclines from the leg portion 40a in the direction approaching the base end portion 40ba of the hook portion 40b and extends radially outward and thereafter becomes substantially parallel to the base end portion 40ba before the base end portion 40ba to locate the hook portion 40b radially outside the core tooth part 22b (not shown in the figure).

In the power supply terminal 40 in the second modification, one leg portion 40a is omitted compared with the power supply terminal 40 in the embodiment and the first modification. Therefore, although the power supply terminal 40 in the second modification is weak in terms of resistance against a tilt, the power supply terminal 40 in the second modification tilts considerably less easily compared with the power supply terminal 40 in which one leg portion 40a is disposed to be parallel to the hook portion 40b. It is possible to prevent the hook portion 40b from hindering the winding of the coil 24.

Since one leg portion 40a and one coupling portion 40c are reduced, it is possible to reduce material expenses.

Common Terminal

The common terminal 41 is explained with reference to FIG. 11, which is a perspective view showing the common terminal 41.

The common terminal 41 includes hook portions 41b, the number of the hook portions 41b corresponds to the number of phases of the motor 1. The end portion of the coil 24 on the opposite side of the end portion connected to the power supply terminal 40 is connected to the hook portions 41b.

Figure 11:
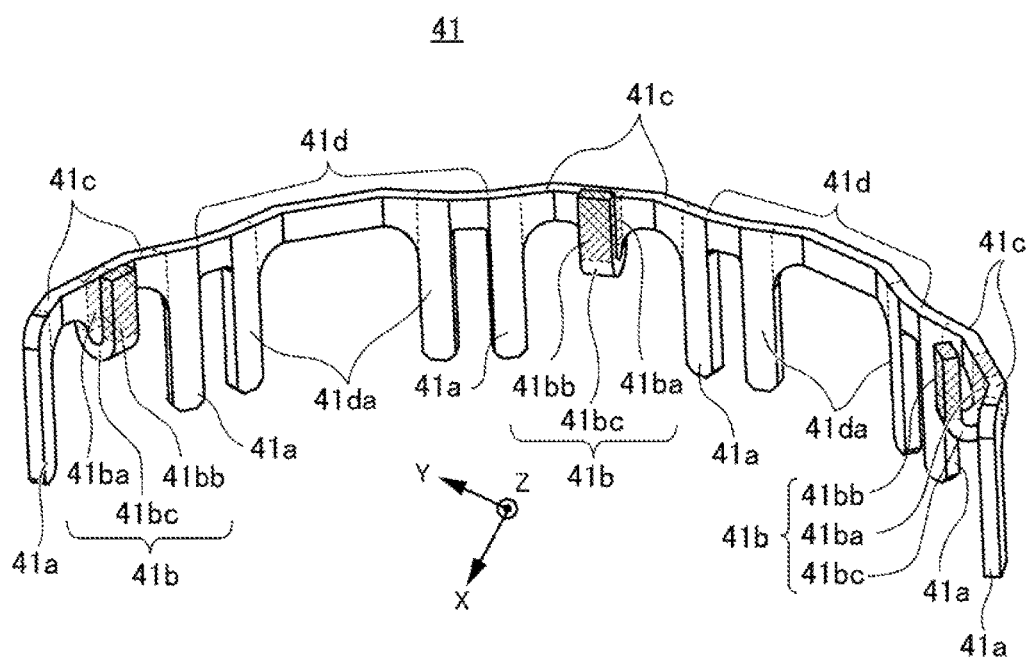
FIG. 11 is a perspective view showing a common terminal in the embodiment according to the present disclosure.

In this embodiment, as explained above, since the quantity of phases is three, three hook portions 41b are provided in the common terminal 41 shown in FIG. 11. However, the quantity of the hook portions 41b may be changed as appropriate according to the number of phases.

The common terminal 41 includes a pair of leg portions 41a provided for each of hook portions 41b to locate the hook portions 41b between the pair of leg portions 41a, a pair of coupling portions 41c connected from the pair of leg portions 41a to a base end portion 41ba of the hook portion 41b corresponding to the pair of the leg portions 41a, and a bridging portion 41d connecting the leg portions 41a located between the hook portions 41b.

Note that, in the common terminal 41, the configuration of the hook portion 41b is the same as the configuration of the power supply terminal 40. The hook portion 41b includes the base end portion 41ba located on the outer side in the radial direction, a side piece portion 41bb located on the inner side in the radial direction to be arranged side by side with the base end portion 41ba, and a connecting portion 41bc connecting an end portion of the base end portion 41ba and an end portion of the side piece portion 41bb located on the opposite side of an open end side opened to the other side in the axial direction (the axial direction of the shaft 11 shown in FIG. 1) to form a closed end. The coupling portions 41c are connected from the pair of the leg portions 41a to the base end portion 41ba of the hook portion 41b corresponding to the pair of leg portions 41a.

The common terminal 41 in this embodiment includes leg portions 41da provided in the bridging portion 41d located adjacent to the leg portions 41a connected by the bridging portion 41d.

Figure 12:
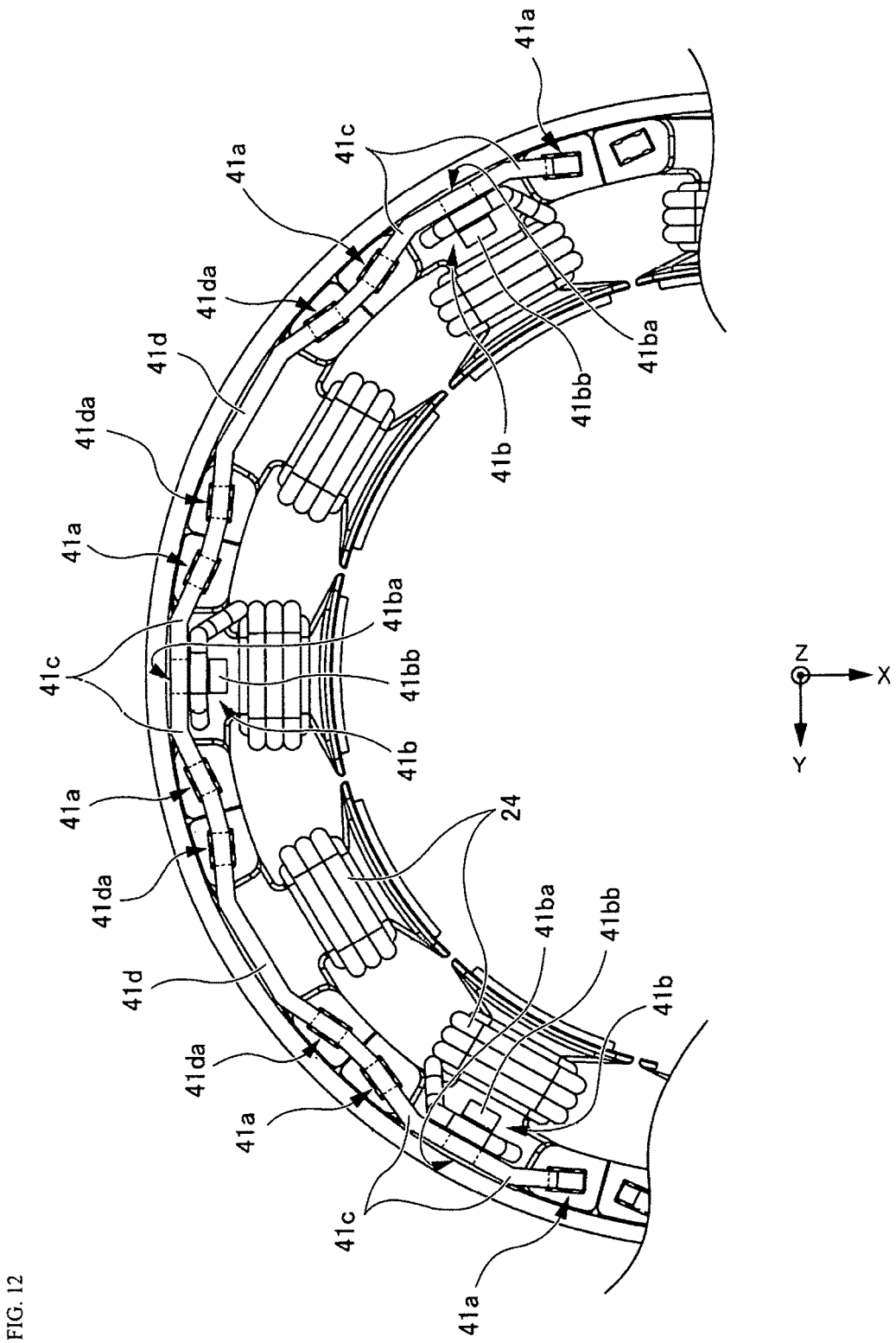
FIG. 12 is an enlarged plan view of a part of the stator on a side where the common terminal is seen in the embodiment according to the present disclosure.

FIG. 12 is an enlarged plan view of a part of the stator 20 on a side where the common terminal 41 is seen.

As shown in FIG. 12, in the common terminal 41, a portion where the hook portion 41b is provided has structure same as the structure of the portion in the power supply terminal 40.

That is, the pair of the coupling portions 41c is bent in a manner in which the pair of the coupling portions 41c inclines from the respective leg portions 41a in a direction approaching the base end portion 41ba of the hook portion 41b corresponding to leg portion 41a and extends radially outward and thereafter becomes substantially parallel to the base end portion 41ba of the corresponding hook portion 41b before the base end portion 41ba of the corresponding hook portion 41b, to locate the hook portion 41b radially outside the core tooth part 22b (not shown in the figure).

As a result, the hook portion 41b provided in the common terminal 41 is also located on the outer side in the radial direction not to hinder the winding of the coil 24.

The bridging portion 41d is also disposed not to be located on or above the coil 24 (i.e., on or above the core tooth part 22b of the core piece main body 22). More specifically, the bridging portion 41d is provided along the core outer circumference part 27a of the core section 27 forming the annular shape configured by the arcuate portions 22a disposed in the annular shape shown in FIG. 5. Therefore, the bridging portion 41d does not hinder the winding of the coil 24.

Note that, in this embodiment, a portion between the leg portions 41da of the bridging portion 41d is formed in a bent structure same as the portion where the hook portion 41b is present except that the hook portion 41b is absent. However, the portion does not need to be formed in this way and may be formed in a shape along the core outer circumference part 27a and to prevent the bridging portion 41d from entering radially inside the core outer circumference part 27a.

Incidentally, in both the hook portion 40b of the power supply terminal 40 and the hook portion 41b of the common terminal 41, the base end portions (40ba, 41ba) and the side piece portions (40bb, 41bb) are arranged side by side in the radial direction (see FIG. 4).

Therefore, it is possible to bring an electrode close to the end portion of the coil 24 for performing fusing caulking from the center side of the stator 20 and the outer side of the stator 20, feed an electric current while appropriately compressing the end portion of the coil 24 held in the hook portion 40b of the power supply terminal 40 or the hook portion 41b of the common terminal 41, and perform the fusing caulking.

The present disclosure is explained above on the basis of the embodiment. However, the present disclosure is not limited to the embodiment. Various changes within a range not departing from the spirit of the present disclosure are also included in the technical scope of the present disclosure.

For example, the leg portions 41da provided in the bridging portion 41d of the common terminal 41 may be omitted.

In this embodiment, the insulators identical to the insulators shown in FIG. 2 are used in the all the core pieces 21 as the insulators 23. As it is seen from FIG. 4, the terminal holding portions 26 are also provided in places where it is essentially unnecessary to attach the leg portions 40a of the power supply terminal 40 and the leg portions 41a and the leg portions 41da of the common terminal 41. However, since the terminal holding portions 26 are unnecessary, the terminal holding portions 26 may be omitted.

However, as in this embodiment, when the shape of the insulators 23 is standardized, productivity is improved and cost is easily reduced. It is unnecessary to perform, while distinguishing the insulators 23, work for mounting the insulators 23 on the core piece main bodies 22. Therefore, since it is possible to improve workability, it is desirable to use the insulators 23 of the same design in all the core pieces 21.

Further, the stator 20 according to the present disclosure is not limited to use the brushless motor and can be suitably used in an inner rotor-type motor not limited to brushless type. Therefore, the stator 20 does not need to be limited to the brushless motor.

That is, the motor 1 according to the present disclosure is an inner rotor-type motor including a rotor rotatably disposed on the inner side of the stator 20 according to the present disclosure.

As described above, the present disclosure is not limited to the specific embodiment. This is evident to those skilled in the art from the description of claims.

What is claimed is:

1. A stator of a motor comprising:
   a core section including a core outer circumference part forming an annular shape and core tooth parts projecting radially inward from the core outer circumference part;
   an insulator covering at least an outer circumference of each of the core tooth parts and an end face in an axial direction of the core outer circumference part;
   a coil wound on each of the core tooth parts via the insulator; and
   a terminal attached to the core outer circumference part via the insulator, an end portion of the coil being connected to the terminal, wherein
   the terminal includes:
      at least one leg portion extending in the axial direction;
      at least one hook portion including an open end opened in the axial direction and disposed on the core outer circumference part at a position corresponding to one of the core tooth parts in a circumferential direction, the end portion of the coil being connected to the hook portion; and
      at least one coupling portion extending from the leg portion in the circumferential direction along the core outer circumference part and connected to the hook portion,
   the insulator includes at least one terminal holding portion, to which the leg portion is attached, at a position in the end face of the core outer circumference part in a position not corresponding to the core tooth parts in the circumferential direction and a position corresponding to the leg portion of the terminal,
   the hook portion includes:
      a base end portion located on an outer side in a radial direction;
      a side piece portion located on an inner side in the radial direction to be arranged side by side with the base end portion; and
      a connecting portion connecting an end portion of the base end portion and an end portion of the side piece portion located on an opposite side of the open end and forming a closed end, and
   the coupling portion of the terminal is bent to locate the hook portion radially outside the core tooth parts.

2. The stator of the motor according to claim 1, wherein the core section further includes core piece main bodies corresponding to the core tooth parts, respectively, each of the core piece main bodies includes:
   an arcuate portion disposed in a circular shape to be a part of the core outer circumference part forming the annular shape; and
   a corresponding one of the core tooth parts located substantially in a center in the circumferential direction of the arcuate portion and projecting radially inward from the arcuate portion,
the insulator includes a plurality of insulators each provided in the core piece main bodies to cover outer circumferences of the core tooth parts of the core piece main bodies and end faces of the arcuate portions forming the end face of the core outer circumference part, and
the terminal holding portion is located on an outer side in the circumferential direction along the arcuate portion of at least one of the plurality of insulators covering the end face of the arcuate portion.

3. The stator of the motor according to claim 1, wherein the terminal is a power supply terminal including a power supply portion extending from the base end portion of the hook portion in the axial direction,
the terminal further includes:
   a pair of the leg portions provided to locate the hook portion between the pair of the leg portions; and
   a pair of the coupling portions connected to the base end portion of the hook portion from the respective pair of the leg portions, and
the pair of the coupling portions is bent in a manner in which the pair of the coupling portions inclines from the respective pair of the leg portions in a direction approaching the base end portion and extends radially outward from the respective pair of the leg portions, and thereafter becomes substantially parallel to the base end portion, to locate the hook portion radially outside the core tooth parts.

4. The stator of the motor according to claim 1, wherein the terminal is a power supply terminal including a power supply portion extending from the base end portion of the hook portion in the axial direction,
the terminal further includes:
   a pair of the leg portions provided to locate the hook portion between the pair of the leg portions; and
   a pair of the coupling portions connected to the base end portion of the hook portion from the respective pair of the leg portions, and
the pair of the coupling portions is bent in a manner in which the pair of the coupling portions extends toward the base end portion from the respective pair of the leg portions while curving radially outward, to locate the hook portion radially outside the core tooth parts.

5. The stator of the motor according to claim 1, wherein the terminal is a power supply terminal including a power supply portion extending from the base end portion of the hook portion in the axial direction the terminal further includes:
   the single leg portion corresponding to the hook portion; and the coupling portion connected to the base end portion of the hook portion from the leg portion, and the coupling portion is bent in a manner in which the coupling portion inclines from the leg portion in a direction approaching the base end portion and extends radially outward from the leg portion and thereafter becomes substantially parallel to the base end portion, to locate the hook portion radially outside the core tooth parts.

6. The stator of the motor according to claim 1, wherein the terminal is a common terminal including the hook portions, a number of the hook portions corresponds to a number of phases of the motor, the terminal further includes:
  a pair of the leg portions provided for each of the hook portions to locate the hook portion between the pair of the leg portions;
  a pair of the coupling portions connected from the pair of the leg portions to the base end portion of the hook portion corresponding to the pair of the leg portions; and further
  at least one bridging portion connecting the leg portions located between the hook portions, the bridging portion is disposed not to be located on or above the core tooth parts, and the pair of the coupling portions is bent in a manner in which the pair of the coupling portions inclines from the respective leg portions in a direction approaching the base end portion of the hook portion corresponding to the leg portions and extends radially outward from the respective leg portions and thereafter becomes substantially parallel to the base end portion of the corresponding hook portion, to locate the hook portion radially outside the core tooth parts.

7. The stator of the motor according to claim 6, wherein the terminal further includes a leg portion provided in the bridging portion to be located adjacent to the leg portions connected by the bridging portion.

8. An inner rotor-type motor comprising:
  the stator of the motor according to claim 1; and
  a rotor rotatably disposed radially inside the stator.

* * * * *